US007920176B2

(12) United States Patent
Watanabe

(10) Patent No.: US 7,920,176 B2
(45) Date of Patent: Apr. 5, 2011

(54) IMAGE GENERATING APPARATUS AND IMAGE REGENERATING APPARATUS

(75) Inventor: Mikio Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 547 days.

(21) Appl. No.: 11/965,466

(22) Filed: Dec. 27, 2007

(65) Prior Publication Data

US 2008/0158369 A1 Jul. 3, 2008

(30) Foreign Application Priority Data

Dec. 27, 2006 (JP) .................................. 2006-353206

(51) Int. Cl.
H04N 5/76 (2006.01)
H04N 13/00 (2006.01)

(52) U.S. Cl. ........................................ 348/231.2; 348/42

(58) Field of Classification Search ............... 348/222.1, 348/296, 345, 349, 350, 353, 42–51, 231.2, 348/231.3, 375, 14.11–14.15
See application file for complete search history.

(56) References Cited

U.S. PATENT DOCUMENTS

| 6,993,196 | B2 | 1/2006 | Sun et al. | |
|---|---|---|---|---|
| 7,444,664 | B2 * | 10/2008 | Lou et al. | 725/105 |
| 7,450,162 | B2 * | 11/2008 | Shioji et al. | 348/231.2 |
| 7,605,776 | B2 * | 10/2009 | Satoh et al. | 345/9 |
| 7,657,056 | B2 * | 2/2010 | Kwon et al. | 382/100 |
| 2003/0174893 | A1 | 9/2003 | Sun et al. | |
| 2004/0090445 | A1 * | 5/2004 | Iizuka et al. | 345/679 |
| 2005/0238224 | A1 * | 10/2005 | Okutsu et al. | 382/154 |
| 2005/0248561 | A1 * | 11/2005 | Ito et al. | 345/419 |
| 2006/0192776 | A1 * | 8/2006 | Nomura et al. | 345/419 |
| 2007/0092145 | A1 * | 4/2007 | Shimizu | 382/233 |

FOREIGN PATENT DOCUMENTS

| EP | 1 351 187 A2 | 10/2003 |
|---|---|---|
| JP | 2002-77942 A | 3/2002 |
| JP | 2003-299016 A | 10/2003 |
| JP | 2004-240469 A | 8/2004 |
| JP | 2004-274091 A | 9/2004 |

OTHER PUBLICATIONS

Notice of Reasons for Rejection, dated Nov. 4, 2010, issued in corresponding JP Application No. 2006-353206, 4 pages in English and Japanese.

* cited by examiner

Primary Examiner — Lin Ye
Assistant Examiner — Trung Diep
(74) Attorney, Agent, or Firm — Sughrue Mion, PLLC

(57) ABSTRACT

An image generating apparatus generating image data of a plurality of different viewpoints, comprises: a file converting device which records the image data of each viewpoint in a general-purpose image file format, and records moving image regeneration information including a regeneration time interval for regenerating each image as a moving image, and viewpoint information for regenerating each image as a three-dimensional image in a file header portion at the beginning of the general-purpose image file. By recording an image of a plurality of viewpoints along with the viewpoint information in a general-purpose moving image format, the exclusive-use regenerating apparatus becomes able to regenerate and display a three-dimensional image and a moving image, and the general-purpose regenerating apparatus becomes able to regenerate as a moving image.

14 Claims, 5 Drawing Sheets

IMAGE GENERATING APPARATUS AND IMAGE REGENERATING APPARATUS

BACKGROUND OF THE INVENTION

1. Field of the Invention

The present invention relates to an image generating apparatus and an image regenerating apparatus, specifically, to an image generating apparatus and an image regenerating apparatus regenerating a plurality of image data photographed from a plurality of viewpoint position as a three-dimensional image or a moving image.

2. Description of the Related Art

Conventionally, such operations have been being executed that an three-dimensional image (video image) and a panoramic image are photographed by an electronic camera such as a digital camera and a digital video camera, and a stereoscopic three-dimensional image (3D image), a wide-ranging landscape image (panoramic image), and the like are regenerated by an image displaying apparatus.

In such a photographing of a three-dimensional image, a three-dimensional image can be obtained by synthesizing a multi-viewpoint image obtained by photographing with a plurality of photographing apparatus from a plurality of different viewpoints (for example, photographing with two photographing apparatuses from two viewpoints as corresponding to both eyes). A three-dimensional image data (digital image data) obtained as the above is recorded and stored in a recording medium such as a magnetic disk, optical disk, and a semiconductor memory.

The variety of technologies has been conventionally known which record and store digital image data expressing such a multi-viewpoint image (and a three-dimensional image obtained from the multi-viewpoint image).

For example, the digital storing apparatus is known which includes digital image description including a header defined by standards, image data coded by standards, and an image terminal portion including non-standard meta-data located at a terminal end of the image data (for example, refer to Japanese Patent Application Laid-Open No. 2003-299016, and the like).

For example, such an image data generating apparatus and an image data regenerating apparatus are known that when data for three-dimensionally displaying an image is generated, a plurality of image data corresponding to each of a plurality of viewpoints is multiplexed, and file names of the plurality of image data are caused to include a common part, and when image information included in the image data is three-dimensional image, the symbol is implanted in a thumbnail image, which indicates that the image information included in the image data is a three-dimensional image (for example, refer to Japanese Patent Application Laid-Open No. 2004-274091, and the like).

For example, the photographing apparatus is known which images a stereo image configured with data of viewpoints which are apart from each other approximately by parallax with one imaging element by using a mirror-type stereo adapter, provides a plurality of photographing image frames corresponding to monocular images in an imaging area of the imaging element, and generates the stereo image, which is a single image, with the plurality of monocular images obtained from the photographing image frames (for example, refer to Japanese Patent Application Laid-Open No. 2002-77942, and the like).

However, for example, if an image is tried to be regenerated based on image data by a general-purpose regenerating apparatus, which is obtained from an image description by the digital storing apparatus according to the above Japanese Patent Application Laid-Open No. 2003-299016, the general-purpose regenerating apparatus can utilize only image data recorded in a standard format, so that there exists such a problem that the non-standard meta-data located at a terminal end of the image data is lost.

For example, if image data is tried to be utilized by the general-purpose regenerating apparatus, which is generated by the image data generating apparatus according to the above Japanese Patent Application Laid-Open No. 2004-274091, there exists such a problem that depending on a method for combining images, when being separately recorded, each data is scattered in a file operation, or cannot be used to regenerate an image by the general-purpose regenerating apparatus other than a exclusive-use apparatus.

Furthermore, for example, since image data photographed by the photographing apparatus according to the above Japanese Patent Application Laid-Open No. 2002-77942 is image data obtained by synthesizing a plurality of scenes in an image, when a user tries to regenerate the image based on this image data, who does not know that this image data has been photographed by such a photographing apparatus, the image obtained by synthesizing a plurality of scenes in one image is regenerated, so that there exists such a problem that this user can not discriminate whether or not it is a failure of an apparatus.

SUMMARY OF THE INVENTION

The present invention has been invented in consideration of the above circumstance, and an object of the present invention is to provide such an image generating apparatus and an image regenerating apparatus that such a problem is eliminated that a multi-viewpoint image can be regenerated only by an exclusive-use regenerating apparatus, and can not be normally regenerated by the general-purpose regenerating apparatus, the part or the whole of each multi-viewpoint image can be also regenerated and displayed by a conventional type general-purpose regenerating apparatus to be confirmed, and relations among the multi-viewpoint images can be visually confirmed.

According to the first aspect of the present invention, an image generating apparatus which is an image generating apparatus generating image data of a plurality of different viewpoints, comprises a file converting device which records the image data of each of the viewpoints in a general-purpose image file format, and records moving image regeneration information including a regeneration time interval for regenerating each image as a moving image, and viewpoint information for regenerating each image as a three-dimensional image in a file header portion at the beginning of the general-purpose image file.

Thereby, by recording an image of a plurality of viewpoints along with the viewpoint information in a general-purpose moving image format, the exclusive-use regenerating apparatus becomes able to regenerate and display a three-dimensional image and a moving image, and the general-purpose regenerating apparatus becomes able to regenerate as a moving image. When the general-purpose regenerating apparatus compiles and restores, all the viewpoint images are stored as moving image data, and are not lost as unknown data.

According to the second aspect of the present invention, the photographing device is included, which is the image generating apparatus according to the first aspect of the present invention, and photographs an identical object from a plurality of different viewpoints.

Thereby, a three-dimensional image of an arbitrary object can be photographed.

According to the third aspect of the present invention, the general-purpose image file format is a motion JPEG format. According to the fourth aspect of the present invention, the general-purpose image file format is a motion JPEG 2000 format. According to the fifth aspect of the present invention, the general-purpose image file format is an I-picture format of MPEG. According to the sixth aspect of the present invention, the general-purpose image file format is a H.264 format.

As described above, a variety of image compression formats can be utilized.

Similarly, to achieve the above object, according to the seventh aspect of the present invention, an image regenerating apparatus for regenerating an image based on image data generated by the image generating apparatus according to any one of the first to sixth aspects of the present invention, is provided with a three-dimensional display converting device which converts, based on the viewpoint information, the image data to a three-dimensional view in accordance with a three-dimensional displaying device displaying each image, and outputs the converted image data to the three-dimension displaying device.

Thereby, by using the viewpoint information recorded in a header portion of the general-purpose image file format, the image data of a plurality of viewpoints, which is recorded in a general-purpose moving image format, becomes able to be three-dimensionally regenerated and displayed.

Similarly, to achieve the above object, according to the eighth aspect of the present invention, an image regenerating apparatus for regenerating an image based on image data generated by the image generating apparatus according to any one of the first to sixth aspects of the present invention, includes a deciding device which decides whether or not the inputted image data in the general-purpose image file format includes the viewpoint information in a file header portion at the beginning of the image data, a selecting device which selects whether the image data is displayed as a three-dimensional image or is displayed as a moving image when the viewpoint information is included, a three-dimensional display converting device which converts, based on the viewpoint information, the image data to a three-dimensional view in accordance with a three-dimensional displaying device displaying each image, and outputs the converted image data to the three-dimension displaying device, when the image data is displayed as a three-dimensional image, and a moving image regenerating signal outputting device which outputs a moving image regenerating signal from the image data when the image data is displayed as a moving image.

Thereby, by using the viewpoint information recorded in a header portion of the general-purpose image file format, the image data of a plurality of viewpoints recorded in the general-purpose moving image format becomes able to be regenerated and displayed as a three-dimensional image or as a moving image.

As described above, according to the aspects of the present invention, by recording the image of a plurality of viewpoints along with the viewpoint information in the general-purpose moving image format, the exclusive-use regenerating apparatus becomes able to regenerate and display the image file as a three-dimensional image or as a moving image, and the general-purpose regenerating apparatus becomes able to regenerate the image file as a moving image. Furthermore, even when the general-purpose regenerating apparatus compiles and restores the image file, all the viewpoint images in the image file are stored as moving image data, and are not lost as unknown data.

DETAILED DESCRIPTION OF THE PREFERRED EMBODIMENTS

An image generating apparatus and an image regenerating apparatus according to the present invention will be described in detail below referring to the attached drawings.

Figure 1:
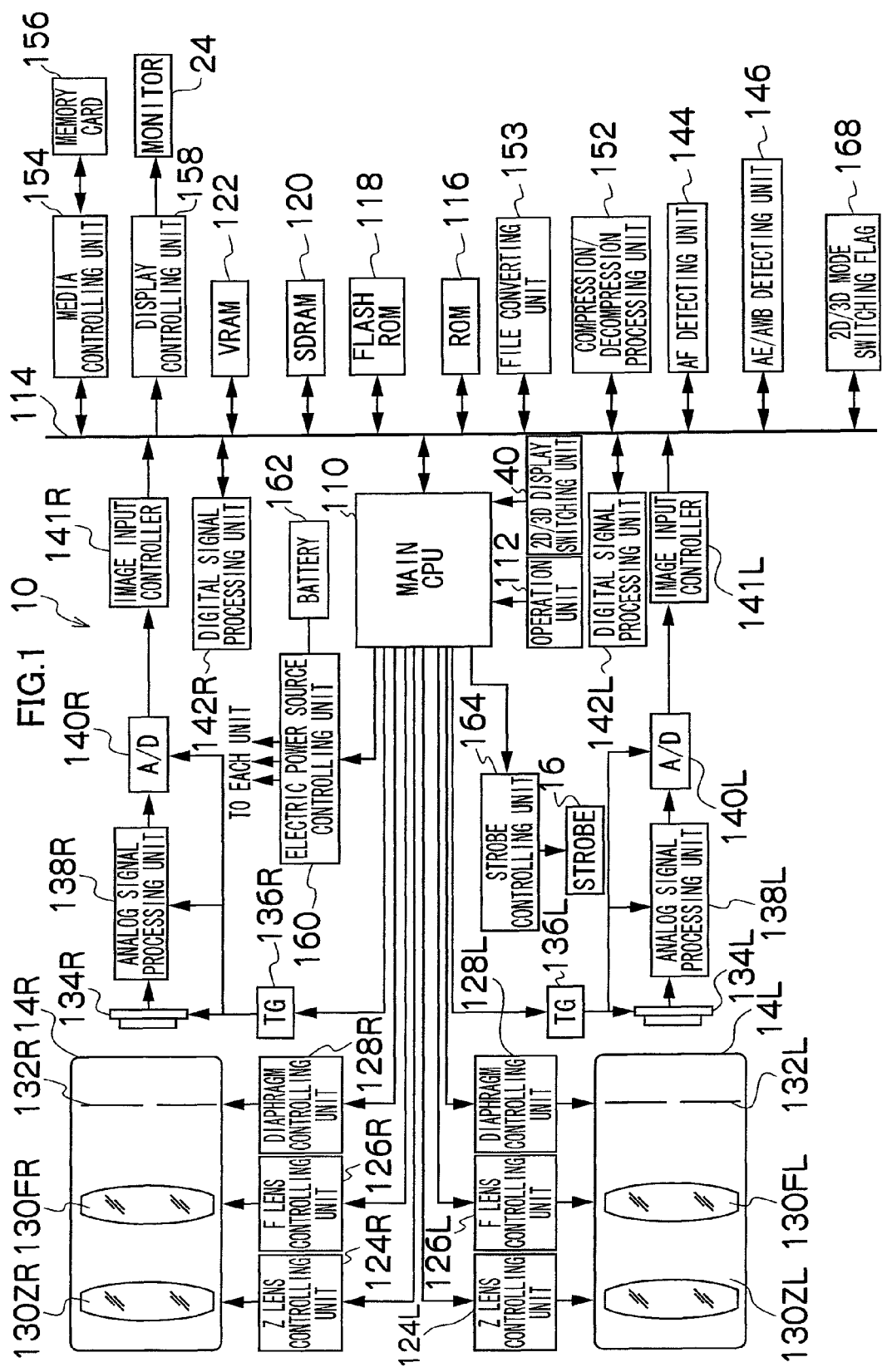
FIG. 1 is a block diagram illustrating a rough configuration of an image generating apparatus according to the present invention.

FIG. 1 is a block diagram illustrating a rough configuration of one embodiment of the image generating apparatus according to the present invention.

As illustrated in FIG. 1, an image generating apparatus (digital camera) 10 is configured to be able to obtain an image signal from each of two imaging systems, and includes a CPU 110, an operation unit (including a shutter button and a variety of operation buttons and switches, etc.) 112, a ROM 116, a flash ROM 118, a SDRAM 120, a VRAM 122, photographing lenses 14R and 14L, zoom lens controlling units 124R and 124L, focus lens controlling units 126R and 126L, diaphragm controlling units 128R and 128L, imaging elements 134R and 134L, timing generators (TG) 136R and 136L, analog signal processing units 138R and 138L, A/D converters 140R and 140L, image input controllers 141R and 141L, digital signal processing units 142R and 142L, an AF detecting unit 144, an AE/AWB detecting unit 146, a compression/decompression processing unit 152, a file converting unit 153, a media controlling unit 154, a memory card 156, a display controlling unit 158, a monitor 24, an electric power source controlling unit 160, a battery 162, a strobe 16, and the like.

A left and upper side part in FIG. 1 is, for example, a part for obtaining an image (a right eye viewing image) from a viewpoint of the right eye when a three-dimensional image is photographed, and is mainly configured with the photographing lens 14R, the zoom lens controlling unit 124R, the focus lens controlling unit 126R, the diaphragm controlling unit 128R, the imaging element 134R, the timing generator (TG) 136R, the analog signal processing unit 138R, the A/D converter 140R, the image input controller 141R, the digital signal processing unit 142R, and the like.

On the other hand, a left and lower side part in FIG. 1 is, for example, a part for obtaining an image (a left eye viewing image) from a viewpoint of the left eye when a three-dimensional image is photographed, and is mainly configured with the photographing lens 14L, the zoom lens controlling unit 124L, the focus lens controlling unit 126L, the diaphragm controlling unit 128L, the imaging element 134L, the timing generator (TG) 136L, the analog signal processing unit 138L, the A/D converter 140L, the image input controller 141L, the digital signal processing unit 142L, and the like.

The CPU 110 functions as a controlling device which totally controls operations of the whole of the image generating apparatus 10, and controls each unit depending on a prescribed control program based on an input from the operation unit 112.

Control programs executed by the CPU 110 and a variety of data (control cycle of AE/AF, etc. to be described below) necessary for the control, and the like are stored in the ROM 116 connected through a bus 114, and a variety of setting information, and the like regarding operations of the image generating apparatus 10, such as user setting information are stored in the flash ROM 118.

The SDRAM 120 is utilized as a calculation work area of the CPU 110, and is utilized as a temporary memory area of image data, and the VRAM 122 is utilized as a temporary memory area dedicated for image data to be displayed.

The pair of right-left photographing lenses 14R and 14L are configured as including zoom lenses 130ZR and 130ZL, focus lenses 130FR and 130FL, and diaphragms 132R and 132L, and are allocated with a prescribed distance (in a body of the image generating apparatus 10).

The zoom lenses 130ZR and 130ZL move backward and forward along an optical axis as driven by zoom actuators which are not illustrated. The CPU 110 controls positions of the zoom lenses for zooming by photographing lenses 14R and 14L by controlling to drive the zoom actuators through the zoom lens controlling units 124R and 124L.

The focus lenses 130FR and 130FL move backward and forward along an optical axis as driven by focus actuators which are not illustrated. The CPU 110 controls positions of the focus lenses to focus the photographing lenses 14R and 14L by controlling to drive the focus actuators through the focus lens controlling units 126R and 126L.

The diaphragms 132R and 132L are, for example, configured with iris diaphragms, and are driven by diaphragm actuators which are not illustrated to operate. The CPU 110 controls an aperture value (diaphragm value) of the diaphragms 132R and 132L to control the amount of incoming light to the imaging elements 134R and 134L by controlling to drive the diaphragm actuators through the diaphragm controlling units 128R and 128L.

When driving the zoom lenses 130ZR and 130ZL, the focus lenses 130FR and 130FL, and the diaphragms 132R and 132L, which the photographing lenses 14R and 14L are configured with, the CPU 110 synchronously drives the right-left photographing lenses 14R and 14L. That is, the right-left photographing lenses 14R and 14L are constantly set at the same focus distance (zooming magnification ratio), and are focus-adjusted so that the same object is constantly in focus. The diaphragm is adjusted so that the amount of incoming light (diaphragm value) is constantly same.

The imaging elements 134R and 134L are configured with a color CCD of a prescribed color filter array. A large number of photodiodes are two-dimensionally arrayed on a light-receiving surface of the CCD. The optical image of an object, which is imaged on the light-receiving surface of the CCD by the photographing lenses 14R and 14L, is converted by the photodiodes to signal charge depending on the amount of incoming light. The signal charge accumulated in each of the photodiodes is sequentially read out from the imaging elements 134R and 134L as a voltage signal (image signal) corresponding to the signal charge based on driving pulses provided from the TG 136R and 136L according to an instruction from the CPU 110.

The imaging elements 134R and 134L are provided with a function of an electronic shutter, and controls a charge accumulation time to the photodiodes to control an exposure time (shutter speed).

In the present invention, while the CCD is used as an imaging element, an imaging element of another configuration such as a CMOS sensor can be also used.

The analog signal processing units 138R and 138L includes a correlation double sampling circuit (CDS) for eliminating a reset noise (low frequency) included in an image signal outputted from the imaging elements 134R and 134L, and an AGS circuit for amplifying the image signal to control the amplitude of the image signal to be a certain level, and processes the image signal outputted from the imaging elements 134R and 134L in a correlation double sampling method and amplifies the image signal.

The A/D converters 140R and 140L converts an analog image signal outputted from the analog signal processing units 138R and 138L to a digital image signal. The image input controllers 141R and 141L input the image signal outputted from the A/D converters 140R and 140L to store in the SDRAM 120.

The digital signal processing units 142R and 142L input the image signal stored in the SDRAM 120 according to an instruction from the CPU 110, and executes a prescribed signal processing to generate a YUV signal configured with a brightness signal Y and color difference signals Cr and Cb. The configuration of the digital signal processing units 142R and 142L will be described in detail below.

The AF detecting unit 144 inputs an image signal of each color of R, G, and B inputted from one side of the image input controller 141R, and calculates a focus estimation value necessary for controlling the AF. The AF detecting unit 144 includes a high-pass filter passing only the high frequency factor of the G signal, an absolute value processing unit, a focus area extracting unit carving out a signal in a prescribed focus area provided in a screen, and an accumulating unit accumulating absolute value data in the focus area, and outputs the absolute value data in the focus area accumulated by the accumulating unit as the focus estimation value to the CPU 110.

When controlling the AF, the CPU 110 searches such a position that the focus estimation value outputted from the AF detecting unit 144 becomes local maximum, and moves the focus lenses 130FR and 130FL to the position, and thereby, executes focusing to a main object. That is, when controlling the AF, the CPU 110 first moves the focus lenses 130FR and 130FL from a close position to the infinity, sequentially obtains the focus estimation value from the AF detecting unit 144 in a moving process, and detects such a position that the focus estimation value becomes local maximum. Next, the CPU 110 decides that such a position is a focused position that the detected focus estimation value is local maximum, and moves the focus lenses 130FR and 130FL to the position. Thereby, an object (main object) positioned in the focus area is caused to be in focus.

The AE/AWB detecting unit 146 inputs an image signal of each color of R, G, and B inputted from one side of the image input controller 141R, and calculates an accumulated value necessary for the AE control and the AWB control. That is, the AE/AWB detecting unit 146 divides a screen to a plurality of areas (e.g. 8×8 area, etc.), and calculates accumulated values of R, G, and B signals (RGB signals) for every divided area.

When controlling the AE, the CPU 110 obtains the accumulated values of R, G, and B signals for every area, which are calculated by the AE/AWB detecting unit 146, obtains the brightness (measured light value) of an object, and sets the exposure for obtaining the appropriate amount of exposed light. That is, parameters are set, such as sensitivity, a diaphragm value, a shutter speed, and necessity of strobe light emission.

When controlling the AWB, the CPU 110 transfers the accumulated values of R, G, and B signals for every area, which are calculated by the AE/AWB detecting unit 146, to the digital signal processing unit 142.

The compression/decompression processing unit 152 compresses inputted image data in a prescribed format to generate compressed image data according to an instruction from the CPU 110. The compression/decompression processing unit 152 decompresses inputted compressed image data in a prescribed format to generate decompressed image data according to an instruction from the CPU 110. Meanwhile, the image generating apparatus 10 of the present embodiment compresses as comforting to the standards of the motion JPEG (AVI) (AVI: Audio Video Interleave).

The file converting unit 153, for example, converts multi-viewpoint image data such as left eye viewing image data and right eye viewing image data to image data in a file format to be described below, and generates an image file.

The media controlling unit 154 controls to read/write data for recording media such as the memory card 156 according to an instruction from the CPU 110. The generated image data is not only recorded in the recording media as described above, but also may be transmitted to an external device by communication to be processed and displayed.

The display controlling unit 158 controls to display to the monitor 24 according to an instruction from the CPU 110. That is, the display controlling unit 158 converts inputted image signal to a video image signal to be displayed in the monitor 24 (e.g. NTSC signal and PAL signal, SCAM signal, and the like) to output to the monitor 24, and also output prescribed characters and figure information to the monitor 24 according to an instruction from the CPU 110.

The electric power source controlling unit 160 controls the electric power source supply from the battery 162 to each unit according to an instruction from the CPU 110. A strobe controlling unit 164 controls light emission of the strobe 16 according to an instruction from the CPU 110. A 2D/3D mode switching flag 168 is provided with a flag indicating that it is in a 2D mode or a 3D mode.

Next, the digital signal processing units 142R and 142L will be described

Figure 2:
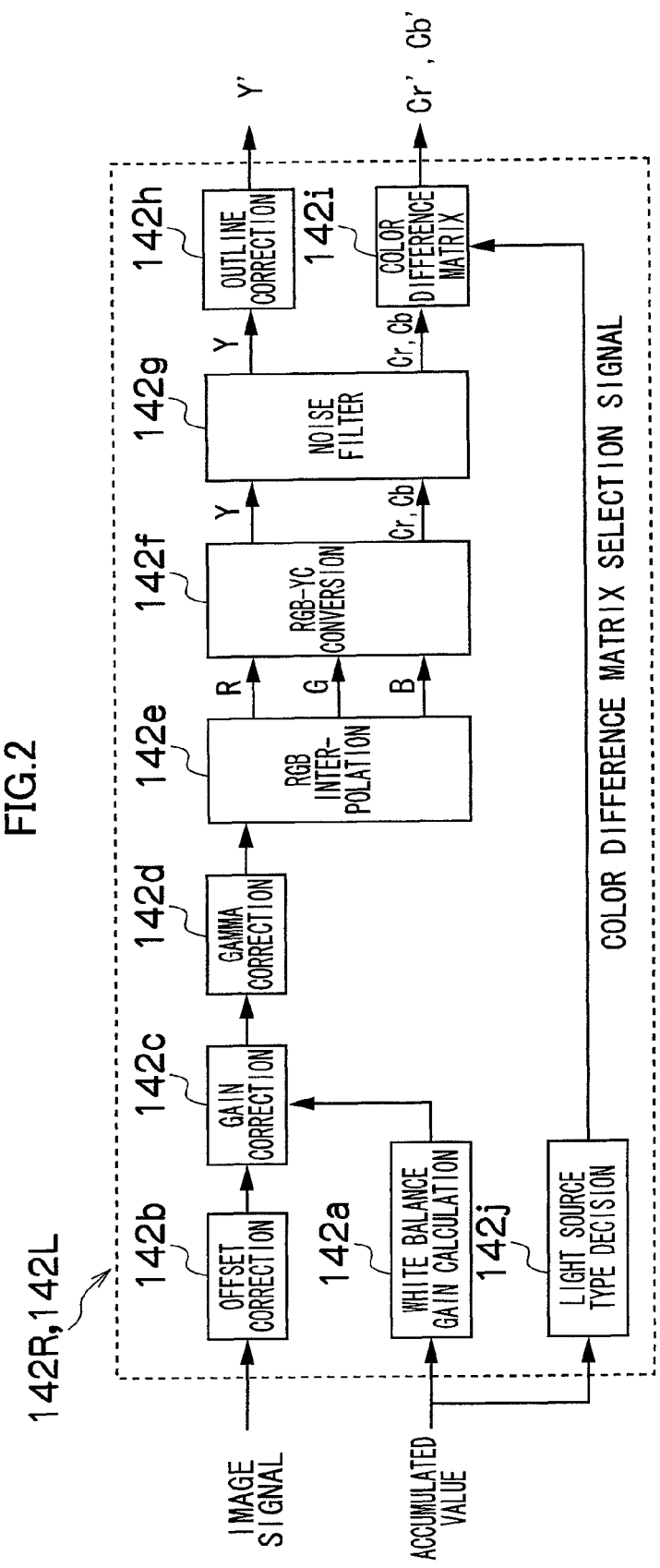
FIG. 2 is a block diagram illustrating a rough configuration of a digital signal processing unit.

FIG. 2 is a block diagram illustrating a rough configuration of the digital signal processing units 142R and 142L.

As illustrated in FIG. 2, the digital signal processing units 142R and 142L are configured as provided with a white balance gain calculating circuit 142a, an offset correcting circuit 142b, a gain correcting circuit 142c, a gamma correcting circuit 142d, a RGB interpolation calculating unit 142e, a RGB/YC converting circuit 142f, a noise filter 142g, an outline correcting circuit 142h, a color difference matrix circuit 142i, and a light source type deciding circuit 142j.

The white balance gain calculating circuit 142a inputs the accumulated value which is calculated by the AE/AWB detecting unit 146 and is transferred by the CPU 110 to calculate a gain value for adjusting the white balance.

The offset correcting circuit 142b off-set-processes for an image signal of each color of R, G, and B inputted through the image input controllers 141R and 141L.

The gain correcting circuit 142c takes in the off-set-processed image signal and adjusts the white balance of the image signal by using a gain value calculated by the white balance gain calculating circuit 142a.

The gamma correcting circuit 142d takes in the image signal whose white balance is adjusted to gamma-correct the image signal by using a prescribed gamma value.

The RGB interpolation calculating unit 142e interpolation-calculates the gamma-corrected color signals of R, G, and B to obtain signals of three colors of R, G, and B at each pixel position. That is, when an imaging element is a single board type, only one color signal of R, G, and B is outputted from each pixel, so that colors which are not outputted are obtained by interpolation-calculating color signals of surrounding pixels. For example, for a pixel outputting R, the magnitude of color signals of G and B at a position of this pixel is obtained by interpolation-calculating from G and B signals of surrounding pixels. As described above, the RGB interpolation-calculation is unique for the imaging element of a single board type, so that the RGB interpolation-calculation becomes unnecessary when a three-board type is used for the imaging element 134.

The RGB/YC converting circuit 142f generates the brightness signal Y and the color difference signals Cr and Cb from R, G, and B signals which have been RGB-interpolation-calculated.

The noise filter 142g reduces noise for the brightness signal Y and the color difference signals Cr and Cb generated by the RGB/YC converting circuit 142f.

The outline correcting circuit 142h corrects an outline for the brightness signal Y whose noise has been reduced and outputs the brightness signal Y' whose outline has been corrected.

On the other hand, the color difference matrix circuit 142i multiplies a color difference matrix (C-MTX) to the color difference signals Cr and Cb whose noise has been reduced to correct a color tone. That is, the color difference matrix circuit 142i is provided with a plurality of types of color difference matrixes corresponding to light sources, switches the color difference matrix to be used according to the light source type obtained by the light source type deciding circuit 142j, multiplies the switched color difference matrix to the inputted color difference signals Cr and Cb, and outputs the color difference signals Cr' and Cb' whose color tone have been corrected.

The light source type deciding circuit 142j takes in the accumulated value calculated by the AE/AWB detecting unit 146, decides the light source type, and outputs a color difference matrix selection signal to the color difference matrix circuit 142i.

Meanwhile, as described above, in the image generating apparatus 10 of the present embodiment, while a digital signal processing unit is configured with a hardware circuit, the same function as that of such a hardware circuit can be configured with a software.

Figure 3:
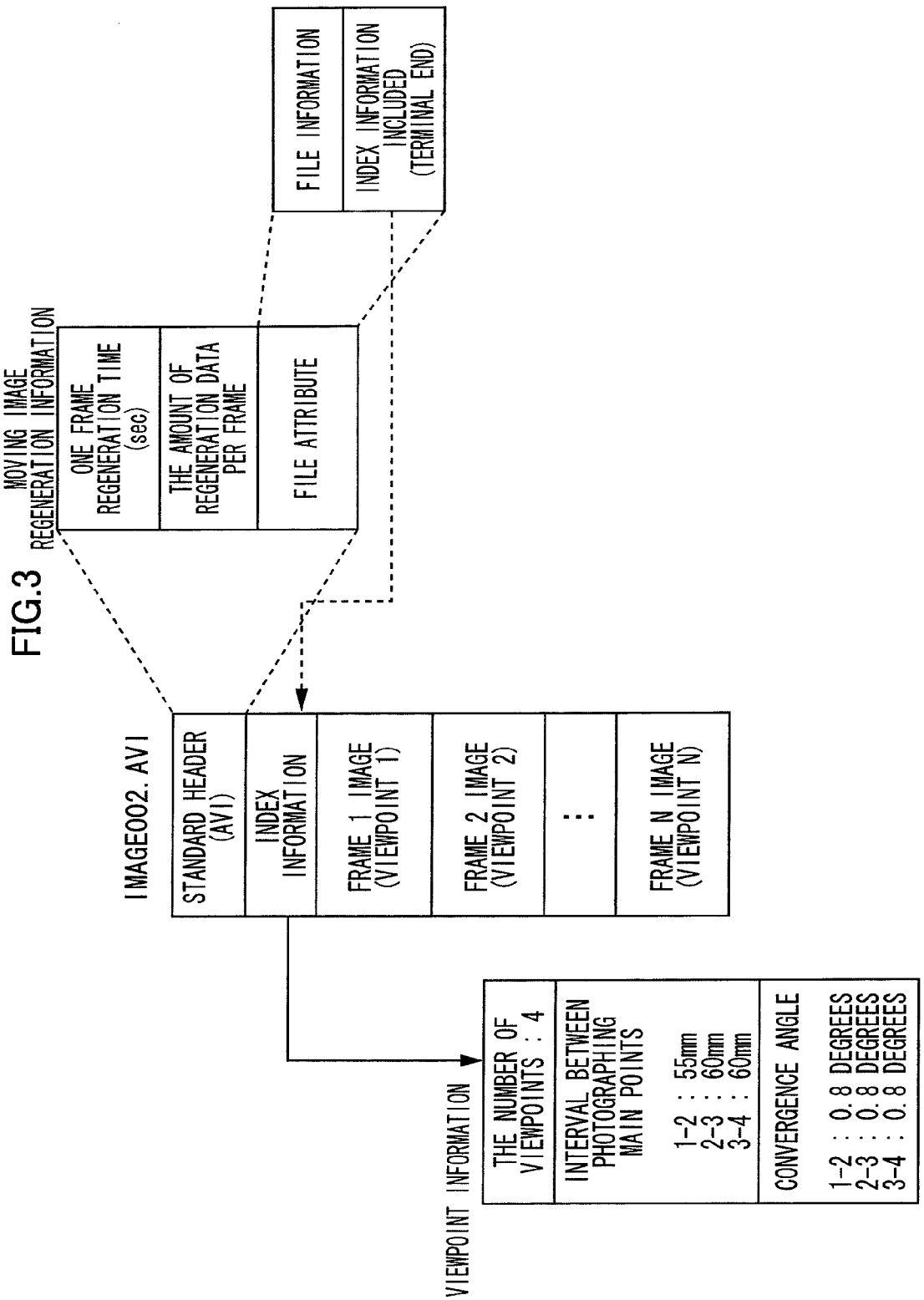
FIG. 3 is an exemplary diagram illustrating a file configuration of image data generated in the image generating apparatus of the present embodiment.

FIG. 3 illustrates a file configuration of the image data generated by the image generating apparatus 10 of the present embodiment.

As illustrated in FIG. 3, the image data has the recording file configuration in the motion JPEG format (AVI format) which is a standard moving image format. A standard header is allocated at the beginning of the image file whose name is Image 002.AVI, index information is subsequently allocated, and the image from each viewpoint is recorded in a frame 1 (viewpoint 1) to a frame n (viewpoint n) after the index information.

When the image generating apparatus 10 includes two imaging elements 134R and 134L as illustrated in FIG. 1, an image is obtained from two viewpoints of a viewpoint from the left eye and a viewpoint from the right eye. That is, the number of frames (the number of viewpoints) becomes two. In such a case, the number of viewpoints can be further increased by photographing as increasing the number of imaging elements and changing positions of the imaging elements.

Moving image regeneration information is recorded in the standard header. As illustrated in FIG. 3, the moving image regeneration information is, for example, configured with one frame regeneration time (sec), the amount of regeneration data per frame, a file attribute, and the like.

If the one frame regeneration time (regeneration interval) is, for example, 33 msec, the moving images of 30 frames are normally regenerated every second. The amount of data to be regenerated per frame is designated as (the number of pixels)×(the number of frames to be regenerated per second). Information indicating whether or not the file information and the index information are included is recorded in the file attribute. Thereby, the index information becomes able to be recorded after the standard header.

As illustrated in FIG. 3, the viewpoint information is recorded in the index information. The viewpoint information is configured with the number of viewpoints, a photographing main point interval, and a convergence angle. While the number of viewpoints is four in the example illustrated in the figure, the number of viewpoints is two in a compound eye camera (image generating apparatus) including two imaging elements as illustrated in FIG. 1.

The photographing main point interval is a distance between centers of each lens. In the example illustrated in the figure, the number of viewpoints is four, four photographing lenses are included, a distance between a lens 1 and a lens 2 is 55 mm, a distance between a lens 2 and a lens 3 is 60 mm, and a distance between a lens 3 and a lens 4 is 60 mm. While all the distances are normally adjusted to the same distance, the distances may slightly differ from each other as described above because of errors or any other reasons.

The convergence angle is an angle between such directions that a main object is viewed from each of lenses, and when such directions that the main object is viewed from two lenses are in parallel, the convergence angle is 0 degree. In the example illustrated in FIG. 3, any one of the convergence angle between the lens 1 and the lens 2, the convergence angle between the lens 2 and the lens 3, and the convergence angle between the lens 3 and the lens 4 is 0.8 degrees, and is equal to each other.

As illustrated in FIG. 3, in the image file, the image data photographed from each viewpoint is recorded in the standard moving image format which is a general purpose image file format following to the standard header and the index information.

In the example of FIG. 3, it is recorded in the index information that the number of viewpoints is four, so that the number of frames is up to four (n is four in the figure). Meanwhile, when an image is photographed by the image generating apparatus 10 of FIG. 1, the number of the viewpoint is two, and two images of a right eye viewing image and a left eye viewing image are recorded as a frame 1 and a frame 2 respectively.

As described above, an image file configuration of the image generating apparatus 10 of the present embodiment includes the viewpoint information in addition to the moving image regeneration information in the standard header portion, and after the viewpoint information, includes an image recorded in the standard moving image format which is the general-purpose image file format. That is, the general-purpose moving file becomes able to be applied to a 3D still image by including the viewpoint information.

Meanwhile, while the image data of each viewpoint, which is recorded following to the index information, is recorded in the general-purpose image file format, this general-purpose image file format is not limited to the above motion JPEG (AVI), and the motion JPEG 2000 may be also used, and a method such as the I-picture of MPEG and the H.264, etc. may be also used. For example, when the motion JPEG 2000 is used, as the above, the moving image regeneration information and the viewpoint information, and the image data from each viewpoint, which is compressed in the JPEG 2000 format, are recorded as one file. When the I-picture of MPEG and the H.264 are used, such information and data are recorded as one file.

Next, a method for generating an image file in the present embodiment will be described by using FIG. 4.

Figure 4:
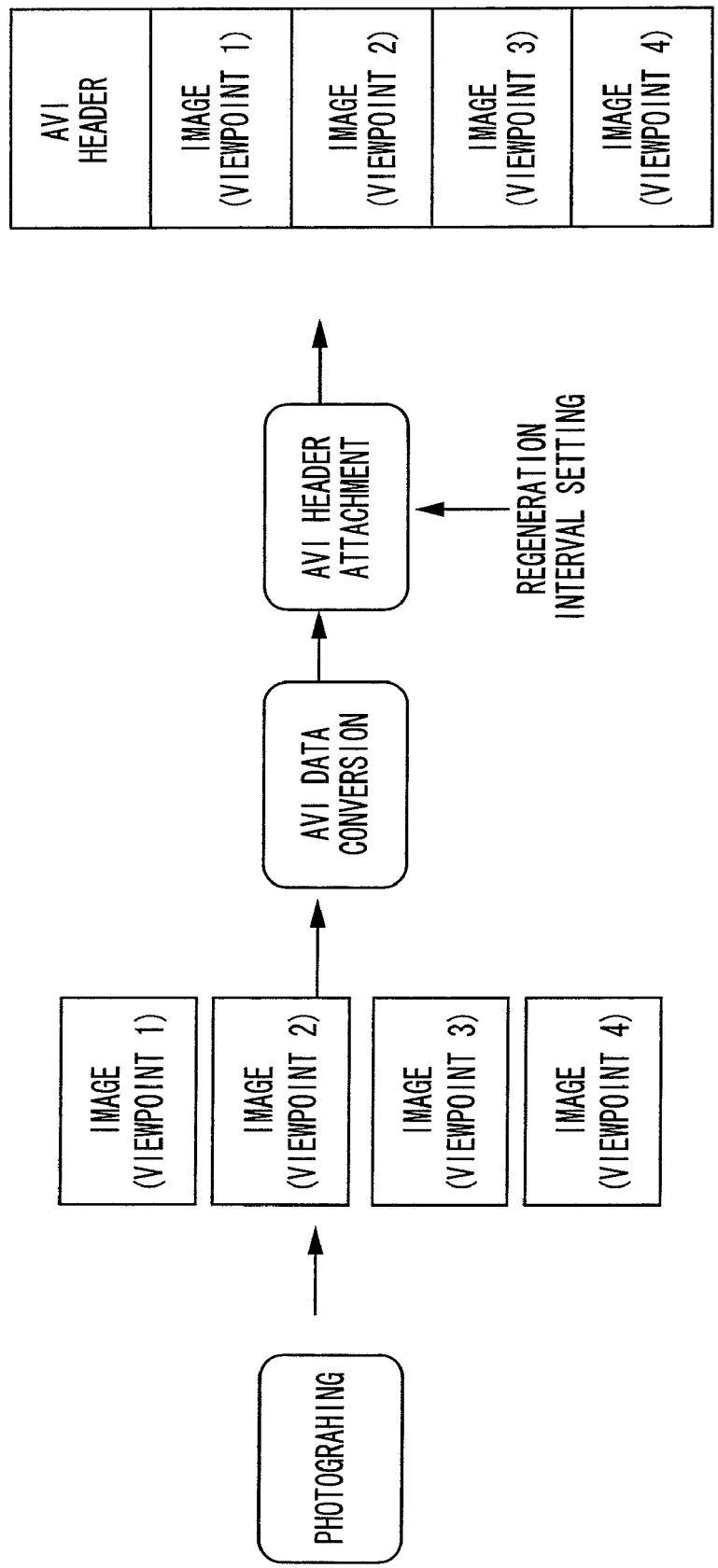
FIG. 4 is an exemplary diagram illustrating a method for generating image file in the present embodiment.

As illustrated in FIG. 4, the images from each viewpoint are first obtained by photographing the main object, which is not illustrated, from multi-viewpoints with the imaging elements 134R and 134L of the image generating apparatus 10. When the main object is photographed with two imaging elements as in the image generating apparatus 10 illustrated in FIG. 1, while the obtained image is a two-viewpoint image from right-left eyes viewpoints, a four-viewpoint image is illustrated in the example of FIG. 4.

Next, the image data photographed from each of such viewpoints is converted at the file converting unit 153 to the AVI data as illustrated in FIG. 3 as the standard moving image format which is the general-purpose image file format. The AVI standard header as illustrated in FIG. 3 is attached to the AVI data. In such a case, the moving image regeneration information including a regeneration time interval (regeneration interval) for regenerating each image as a moving image and the viewpoint information for regenerating each image as a three-dimensional video image are provided in the standard header.

As described above, when a three-dimensional image is formed by photographing a multi-viewpoint image with the image generating apparatus including a plurality of imaging elements, and the three-dimensional image is regenerated by the general-purpose moving image regenerating apparatus, the regenerating operation is terminated for just a short time, so that, in such a case, one frame regeneration time (regeneration interval) in the moving image regeneration information is set longer, for example, to 500 msec, etc.

As described above, the image file is generated by the file converting unit 153, to which the image data from each of the viewpoints is attached following to the standard AVI header including the moving image regeneration information and the viewpoint information.

Meanwhile, in the image generating apparatus, for example, the camera allocation (a distance and an angle (convergence angle) among adjacent cameras) in photographing may be separately measured with sensors provided in the camera, and may be recorded as the viewpoint information. In addition, for example, in the apparatus which synthesizes two images including parallax (a left-eye viewing image data and a right-eye viewing image data) due to the parallax of right-left eyes to generate three-dimensional image data, and generates the three-dimensional image data by synthesizing the images, the values which are set when the images are synthesized may be converted to the viewpoint information to be recorded.

Meanwhile, while the image generating apparatus 10 of the above embodiment is so-called a compound eyes camera including two imaging elements, the image generating apparatus may include only one imaging element, photograph a plurality of times as changing the viewpoint from which an object is photographed, and record the viewpoint information of each photographing in the header.

Alternatively, by contraries, the image generating apparatus does not include an imaging element, and the multi-viewpoint image data, which is obtained by photographing with another photographing apparatus, is inputted to the image generating apparatus, and the image file may be formed, which is described above.

Figure 5:
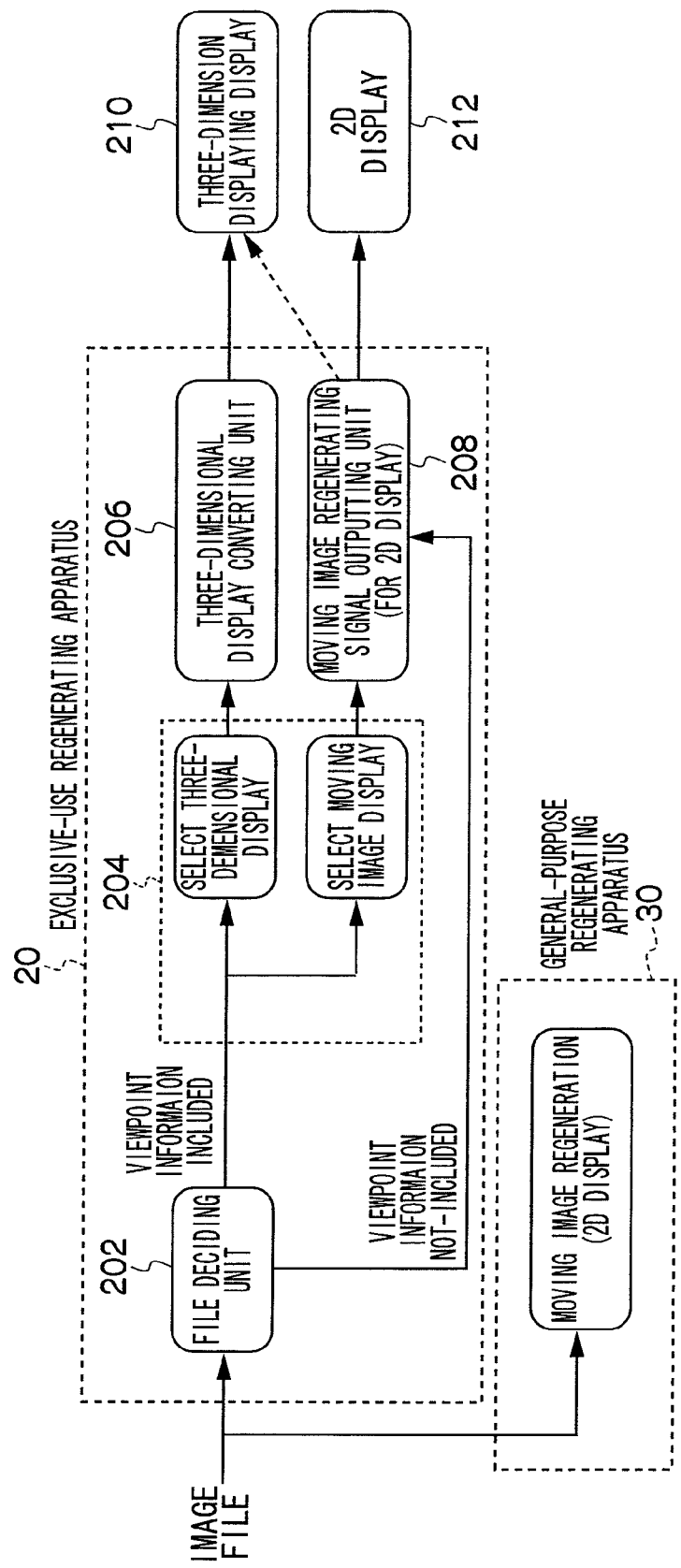
FIG. 5 is a block diagram illustrating a rough configuration of a regenerating apparatus of multi-viewpoint image according to the present invention.

Next, the regeneration of an image will be described. FIG. 5 illustrates a rough configuration of an image regenerating system.

As illustrated in FIG. 5, the image regenerating system is configured with an exclusive-use regenerating apparatus 20 for regenerating an image file generated in the present embodiment and a general-purpose regenerating apparatus 30.

The exclusive-use regenerating apparatus 20 is configured as including a file deciding unit 202, a display selecting unit 204, a three-dimensional display converting unit 206, and a moving image regenerating signal outputting unit 208. A three-dimension displaying display 210 and a 2D display 212 are connected to the exclusive-use regenerating apparatus 20. On the other hand, the general-purpose regenerating apparatus 30 is provided with a 2D display for regenerating a moving image.

The image file generated by the image generating apparatus 10 is inputted from recording media such as the memory card 156, etc., or by a communication to the exclusive-use regenerating apparatus 20 and the general-purpose regenerating apparatus 30.

The file deciding unit 202 decides whether or not the viewpoint information as illustrated in FIG. 3 is recorded in the inputted image file. When the viewpoint information is recorded in the inputted image file, the image file is inputted to the display selecting unit 204. When the viewpoint information is not recorded in the inputted image file, the image file can not be displayed as a three-dimensional image, so that the image file is inputted to the moving image regenerating signal outputting unit 208.

In the display selecting unit 204, a user selects to three-dimensionally display the image file, or display as a moving image. The display selecting unit 204 may automatically select this display mode. When the three-dimensional display is selected, the image file is inputted to the three-dimensional display converting unit 206. When the moving image display is selected, the image file is inputted to the moving image regenerating signal outputting unit 208.

The three-dimensional display converting unit 206 converts the format of the inputted image file to the format corresponding to a display format of the three-dimension displaying display 210 to be described below. On the other hand, the moving image regenerating signal outputting unit 208 converts the inputted image file so as to display as a moving image with the 2D display 212, and outputs the moving image regenerating signal.

The three-dimension displaying display 210 displays the multi-viewpoint image as a three-dimensional image, is not limited to a specific method, and can be applied to a variety of methods. For example, there exist such a method that two-viewpoint image data corresponding to the right-left eyes is displayed at separate liquid crystal panels for the right-left eyes (Head Mounted Display method), such a method that right-left images corresponding to the right-left eyes are alternately displayed as synchronizing a liquid crystal shutter glasses and a CRT (liquid crystal shutter method), such a method that right-left images are separated by projecting images whose polarizations are different in the right-left sides and using a polarized glasses whose polarizations are different in the right-left sides (three-dimensional projector method), and such a method that images to both eyes look three-dimensional as separated when viewed from a specific position by combining a liquid crystal panel and a lenticular lens (lenticular method).

As the three-dimension displaying display 210 of the present embodiment, specifically, 3D image display and 2D image display, may be able to be switched.

When the three-dimension displaying display 210 can be switched to 3D and 2D, and even when the display selecting unit 204 selects a moving image display, the moving image data can be outputted from the moving image regenerating signal outputting unit 208 to the three-dimension displaying display 210 switched to the 2D display, and can be regenerated as a moving image at the three-dimension displaying display 210.

On the other hand, an image file inputted to the general-purpose regenerating apparatus 30 is a standard AVI file, therefore the image file is regenerated as a moving image in a prescribed interval. That is, while the general-purpose regenerating apparatus 30 also regenerates a multi-viewpoint image as a normal moving image, as described above, one frame regeneration time is, for example, set to 500 msec which is longer than 33 msec of the normal moving image, so that relation between each image such as the amount of parallax or the change of image angle can be easily confirmed.

As described above, the three-dimensional regeneration display or the moving image regeneration becomes available by the exclusive-use regenerating apparatus by recording the multi-viewpoint image in the general-purpose moving image format, and adding the viewpoint information other than the moving image regeneration information in a header. In such a case, the same multi-viewpoint image data can be regenerated as a moving image in the general-purpose regenerating apparatus.

Even when the image data is compiled and restored in the general-purpose regenerating apparatus, all the viewpoint image are stored as moving image data, are not thrown away as non-standard data, and are not lost as unknown data.

The image generating apparatus and the image regenerating apparatus of the present invention are described in detail above, the present invention is not limited to the above examples, and it is apparent that a variety of improvements and changes may be applied without departing from the scope of the present invention.

What is claimed is:

1. An image generating apparatus generating image data of a plurality of different viewpoints, comprising:
   a file converting device which records the image data of each viewpoint in a general-purpose image file format, and records moving image regeneration information including a regeneration time interval for regenerating each image as a moving image, a file attribute for recording an amount of regeneration data per frame and whether or not a file information and an index information exist, and viewpoint information for regenerating each image as a three-dimensional image recorded in the file attribute and that includes the number of viewpoints, a photographing main point interval, and a convergence angle in a file header portion at the beginning of the general-purpose image file.

2. The image generating apparatus according to claim 1, wherein the general-purpose image file format is a motion JPEG format.

3. The image generating apparatus according to claim 1, wherein the general-purpose image file format is a motion JPEG 2000 format.

4. The image generating apparatus according to claim 1, wherein the general-purpose image file format is an I-picture format of MPEG.

5. The image generating apparatus according to claim 1, wherein the general-purpose image file format is a H. 264 format.

6. The image generating apparatus according to claim 1, further comprising:
- a photographing device which photographs an identical object from a plurality of different viewpoints.

7. The image generating apparatus according to claim 6, wherein the general-purpose image file format is a motion JPEG format.

8. The image generating apparatus according to claim 6, wherein the general-purpose image file format is a motion JPEG 2000 format.

9. The image generating apparatus according to claim 6, wherein the general-purpose image file format is an I-picture format of MPEG.

10. The image generating apparatus according to claim 6, wherein the general-purpose image file format is a H. 264 format.

11. An image regenerating apparatus for regenerating an image based on image data generated by the image generating apparatus according to claim 1, comprising:
- a three-dimensional display converting device which converts, based on the viewpoint information, the image data to a three-dimensional view in accordance with a three-dimensional displaying device displaying each image, and outputs the converted image data to the three-dimension displaying device.

12. An image regenerating apparatus for regenerating an image based on image data generated by the image generating apparatus according to claim 1, comprising:
- a deciding device which decides whether or not the inputted image data in the general-purpose image file format includes the viewpoint information in a file header portion at the beginning of the image data;
- a selecting device which selects to display the image data as a three-dimensional image or display the image data as a moving image if the inputted image data includes the viewpoint information;
- a three-dimensional display converting device which converts, based on the viewpoint information, the image data to a three-dimensional view in accordance with a three-dimensional displaying device displaying each image, and outputs the converted image data to the three-dimension displaying device, when the image data is displayed as a three-dimensional image; and
- a moving image regenerating signal outputting device which outputs a moving image regenerating signal from the image data when the image data is displayed as a moving image.

13. An image regenerating apparatus for regenerating an image based on image data generated by the image generating apparatus according to claim 6, comprising:
- a three-dimensional display converting device which converts, based on the viewpoint information, the image data to a three-dimensional view in accordance with a three-dimensional displaying device displaying each image, and outputs the converted image data to the three-dimension displaying device.

14. An image regenerating apparatus for regenerating an image based on image data generated by the image generating apparatus according to claim 6, comprising:
- a deciding device which decides whether or not the inputted image data in the general-purpose image file format includes the viewpoint information in a file header portion at the beginning of the image data;
- a selecting device which selects to display the image data as a three-dimensional image or display the image data as a moving image if the inputted image data includes the viewpoint information;
- a three-dimensional display converting device which converts, based on the viewpoint information, the image data to a three-dimensional view in accordance with a three-dimensional displaying device displaying each image, and outputs the converted image data to the three-dimension displaying device, when the image data is displayed as a three-dimensional image; and
- a moving image regenerating signal outputting device which outputs a moving image regenerating signal from the image data when the image data is displayed as a moving image.

* * * * *